(12) United States Patent
Yi (10) Patent No.: US 10,000,226 B2
(45) Date of Patent: Jun. 19, 2018

(54) INFANT STROLLER APPARATUS

(71) Applicant: Wonderland Nurserygoods Company Limited, Tuen Mun, N.T. (HK)

(72) Inventor: Zehua Yi, Tuen Mun (CN)

(73) Assignee: Wonderland Switzerland AG (CH)

( * ) Notice: Subject to any disclaimer, the term of this patent is extended or adjusted under 35 U.S.C. 154(b) by 0 days. days.

(21) Appl. No.: 15/470,230

(22) Filed: Mar. 27, 2017

(65) Prior Publication Data

US 2017/0282952 A1  Oct. 5, 2017

(30) Foreign Application Priority Data

Mar. 29, 2016  (CN) .......................... 2016 1 0186916

(51) Int. Cl.
| | | |
|---|---|---|
| *B62B 1/00* | (2006.01) | |
| *B62B 7/06* | (2006.01) | |
| *B62B 7/14* | (2006.01) | |
| *B62B 9/20* | (2006.01) | |

(52) U.S. Cl.
CPC .............. *B62B 7/062* (2013.01); *B62B 7/142* (2013.01); *B62B 9/20* (2013.01)

(58) Field of Classification Search
CPC .... B62B 7/08; B62B 7/12; B62B 3/02; B62B 7/044; B62B 3/144; B62B 2205/20; B60N 2/2806; B60N 2/2854; B25H 7/04
See application file for complete search history.

(56) References Cited

U.S. PATENT DOCUMENTS 5,257,799 A * 11/1993 Cone ......................... B62B 5/04
                                                                280/47.36
7,188,858 B2 * 3/2007 Hartenstine ............. B62B 7/083
                                                                280/642

FOREIGN PATENT DOCUMENTS

| CN | 1751936 A | 3/2006 |
|---|---|---|
| CN | 201116134 Y | 9/2008 |
| CN | 100463825 C | 2/2009 |
| CN | 201745620 U | 2/2011 |
| CN | 201914293 U | 8/2011 |

(Continued)

OTHER PUBLICATIONS

Translation into English of the Abstracts of the non-English documents submitted herewith.

(Continued)

*Primary Examiner* — John D Walters
*Assistant Examiner* — James J Triggs
(74) *Attorney, Agent, or Firm* — Daniel A. Tallitsch; Baker McKenzie LLP (57) ABSTRACT

An infant stroller apparatus includes a first and a second leg frame respectively having a first and a second side segment respectively connected fixedly with a first and a second coupling part, and a handle frame having a third side segment fixedly connected with a third coupling part. The second and third coupling parts are respectively connected pivotally with the first coupling part. Moreover, the infant stroller apparatus includes a first latch operable to rotationally lock the handle frame with respect to the first leg frame, a second latch operable to rotationally lock the second leg frame with respect to the first leg frame, and a linkage assembly respectively connected with the third coupling part and the second latch such that a folding rotation of the handle frame relative to the first leg frame urges an unlocking displacement of the second latch.

17 Claims, 9 Drawing Sheets

(56) References Cited

FOREIGN PATENT DOCUMENTS

| | | |
|---|---|---|
| CN | 101734271 B | 1/2012 |
| CN | 203111262 U | 8/2013 |
| CN | 203698367 U | 7/2014 |
| CN | 203739940 U | 7/2014 |
| CN | 203805960 U | 9/2014 |
| EP | 2363334 B1 | 3/2012 |
| EP | 2636571 A2 | 11/2013 |
| TW | 308211 M | 7/1995 |
| WO | 2007045149 A1 | 4/2007 |
| WO | 2010015003 A1 | 2/2010 |

OTHER PUBLICATIONS

The Search Report in co-pending UK Patent Application No. 1704284.7 (WO 2010/015003 A1) dated Aug. 29, 2017.

* cited by examiner

INFANT STROLLER APPARATUS

CROSS-REFERENCE TO RELATED APPLICATION(S)

This application claims priority to China Patent Application No. 201610186916.X filed on Mar. 29, 2016.

BACKGROUND

1. Field of the Invention

The present invention relates to infant stroller apparatuses.

2. Description of the Related Art

Caregivers usually rely on a stroller apparatus to transport babies and children. A stroller apparatus is typically constructed from a metal frame that comprises the assembly of metal and plastic parts, and a fabric element that connects or wraps around the metal frame. When it is unused, the stroller apparatus can be collapsed for convenient storage or transport. The construction adopted for the folding mechanism of the stroller apparatus plays an important role in the design of the stroller since it has to be safe and convenient to handle in different situations while not affecting the appealing aesthetics of the stroller.

In some existing construction, the stroller frame may typically include a front leg and a rear leg pivotally connected with each other, a handle frame pivotally connected with the front leg, and a latch mechanism that can effect a locking engagement between the handle frame and the front leg so as to lock the stroller frame in an unfolded state. This approach is limited to a specific stroller frame construction that requires a direct pivot connection between the handle frame and the front leg, and cannot be implemented in other different constructions of stroller frames.

Therefore, there is a need for an infant stroller apparatus that can be convenient to fold and unfold, and address at least the foregoing issues.

SUMMARY

The present application describes an infant stroller apparatus that is easy to collapse and unfold. In one embodiment, the infant stroller apparatus includes a first leg frame having a first side segment fixedly connected with a first coupling part, a second leg frame having a second side segment fixedly connected with a second coupling part, and a handle frame having a third side segment fixedly connected with a third coupling part. The second coupling part is pivotally connected with the first coupling part, and the third coupling part is pivotally connected with the first coupling part. Moreover, the infant stroller apparatus further includes a first latch that is disposed between the first and third coupling parts and is operable to rotationally lock the handle frame with respect to the first leg frame in an unfolded state of the infant stroller apparatus, a second latch that is disposed between the first and second coupling parts and is operable to rotationally lock the second leg frame with respect to the first leg frame in the unfolded state of the infant stroller apparatus, and a linkage assembly respectively connected with the third coupling part and the second latch such that a folding rotation of the handle frame relative to the first leg frame urges an unlocking displacement of the second latch.

DETAILED DESCRIPTION OF THE EMBODIMENTS

Figure 1:
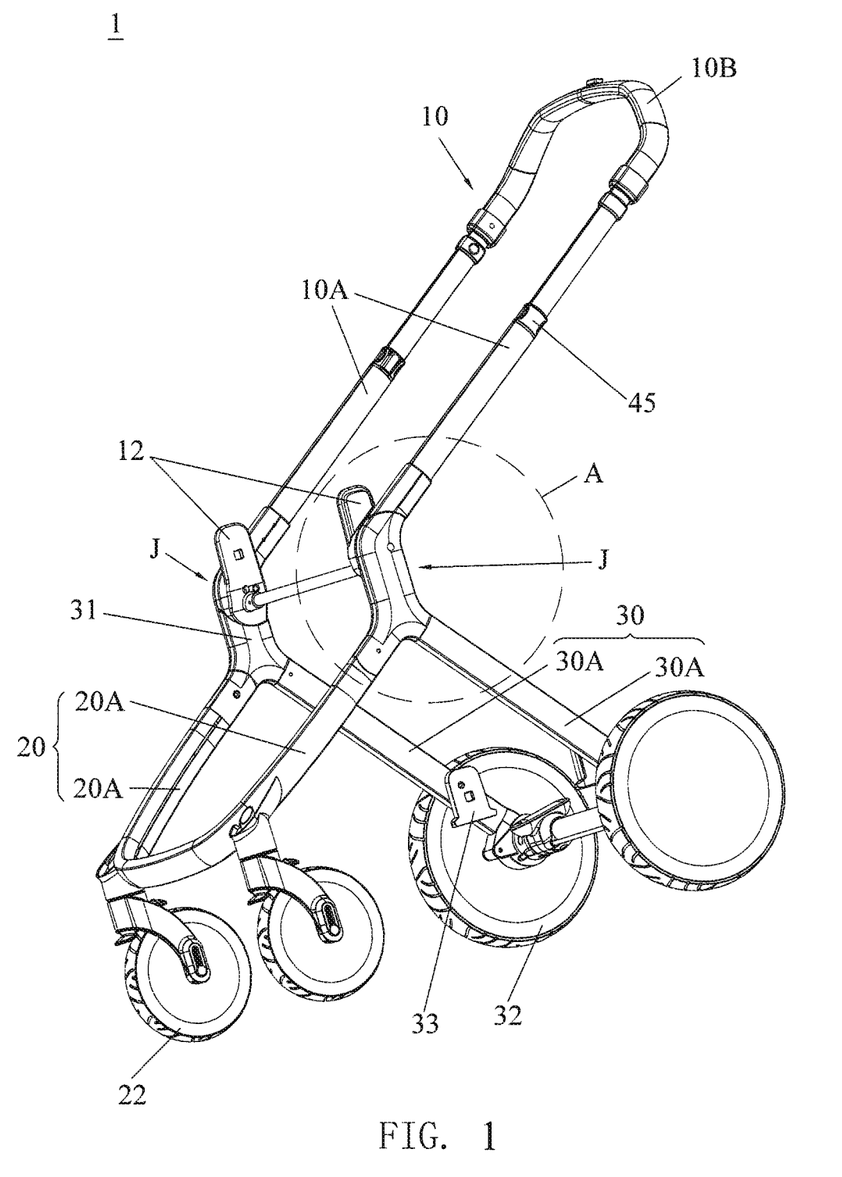
FIG. 1 is a perspective view illustrating an embodiment of an infant stroller apparatus in an unfolded state for use.
Figure 2:
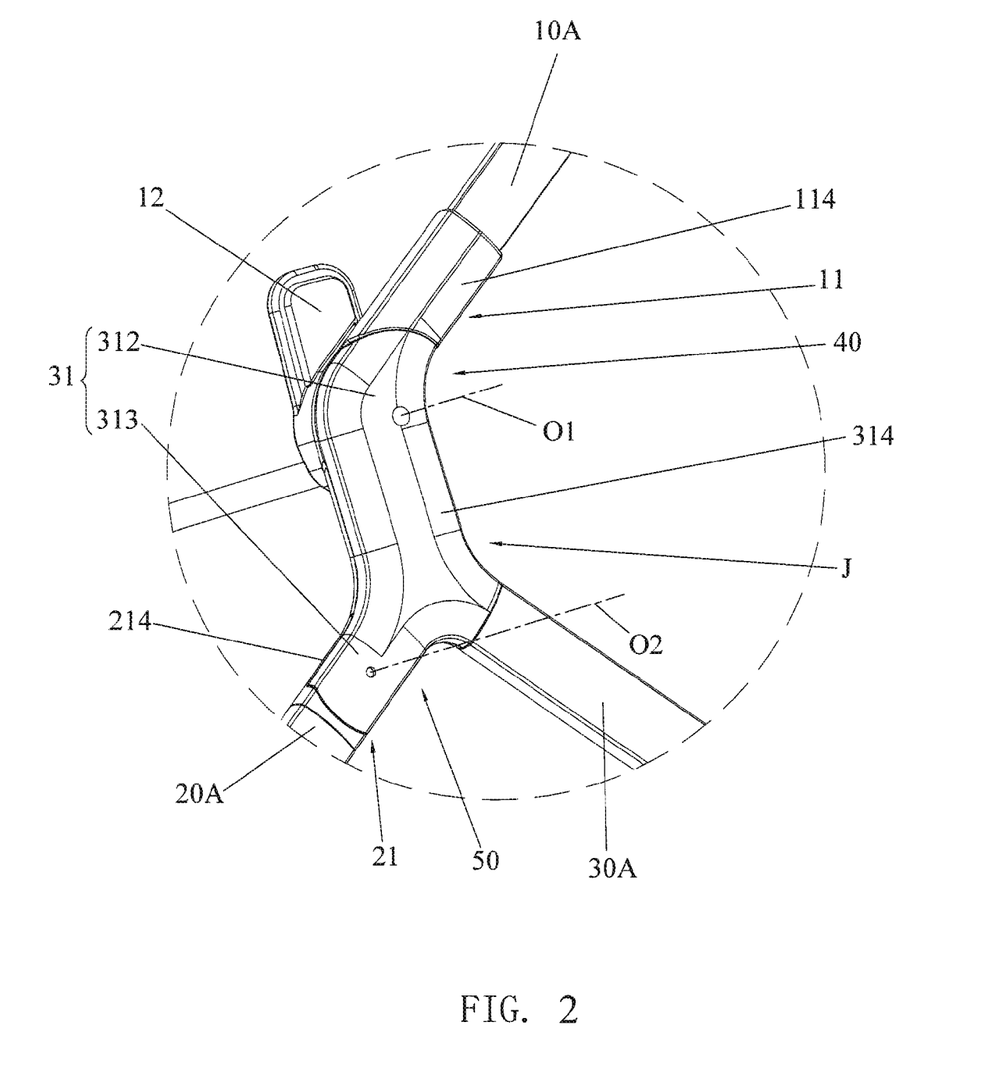
FIG. 2 is an enlarged view of portion A shown in FIG. 1.
Figure 3:
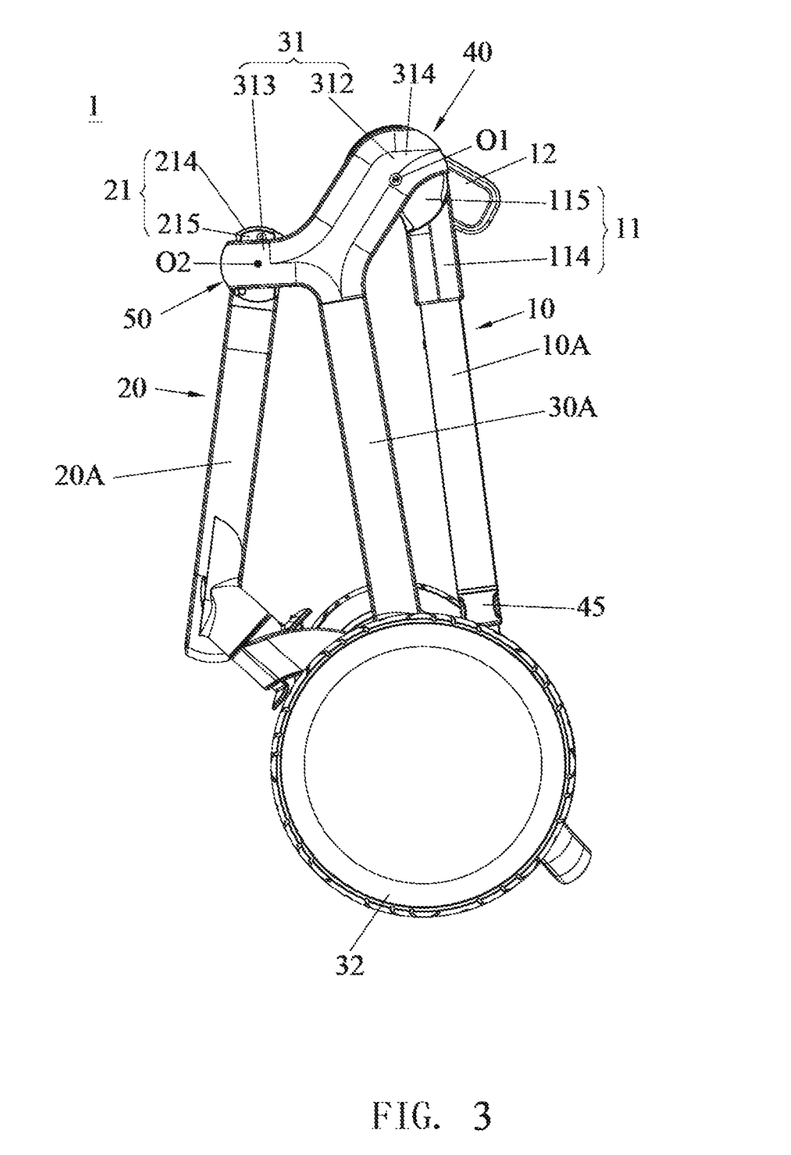
FIG. 3 is a side view illustrating the infant stroller apparatus in a collapsed state.

FIG. 1 is a perspective view illustrating an embodiment of an infant stroller apparatus 1, FIG. 2 is an enlarged view of portion A of the infant stroller apparatus 1 shown in FIG. 1, and FIG. 3 is a side view illustrating the infant stroller apparatus 1 in a collapsed state. Referring to FIG. 1, the infant stroller apparatus 1 can include a handle frame 10, a front leg frame 20 and a rear leg frame 30. The front leg frame 20 can have a left and a right side segment 20A, and can be assembled with two front wheels 22 respectively disposed near the lower portions of the two side segments 20A. Likewise, the rear leg frame 30 can have a left and a right side segment 30A, and can be assembled with two rear wheels 32 respectively disposed near the lower portions of the two side segments 30A. The handle frame 10 can have a left and a right side segment 10A, and a transversal segment 10B connected with the left and right side segments 10A. At each of the left and right sides, the side segment 10A of the handle frame 10 and the side segment 20A of the front leg frame 20 can be respectively connected pivotally with the side segment 30A of the rear leg frame 30 via a joint structure J allowing respective rotation of the handle frame 10 and front leg frame 20 relative to the rear leg frame 30 for folding and unfolding the infant stroller apparatus 1.

Figure 4:
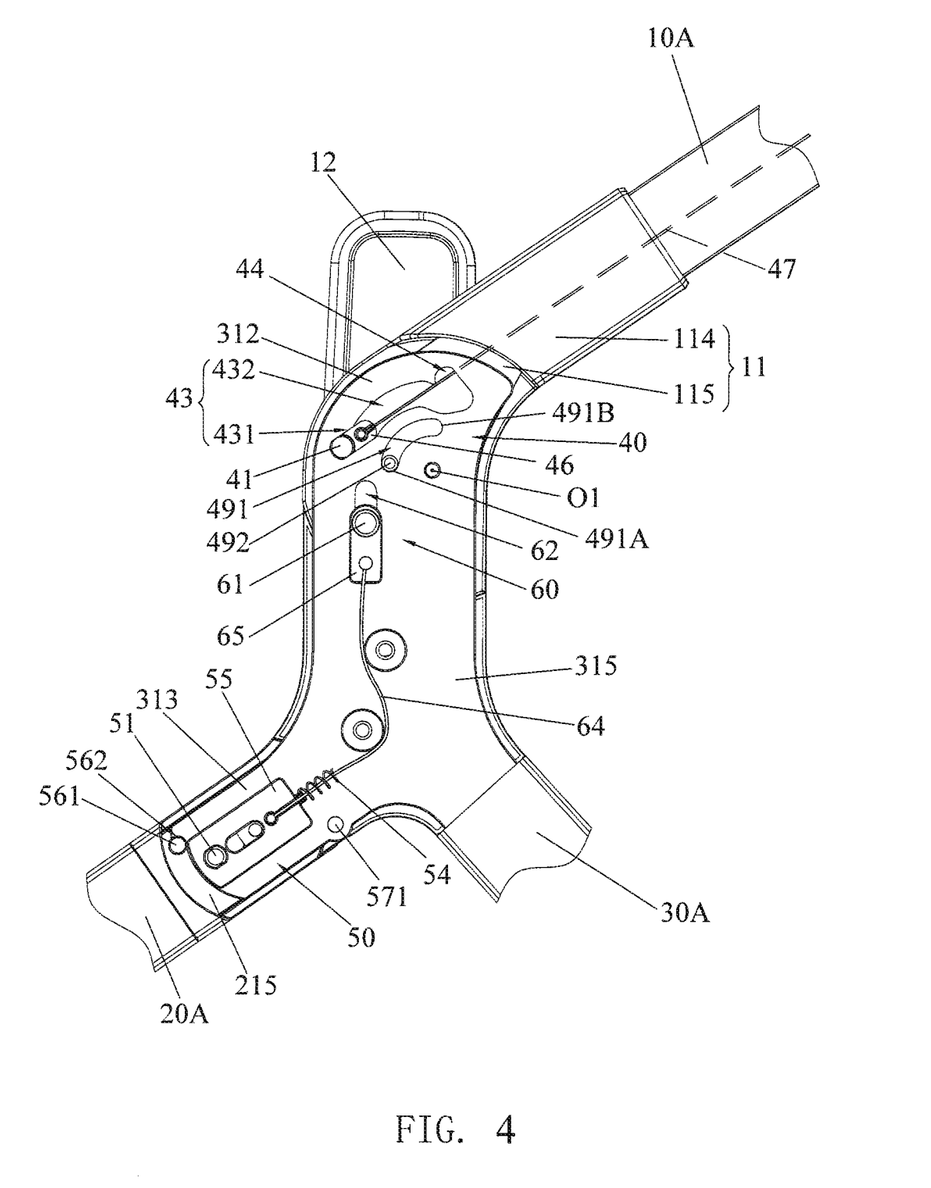
FIG. 4 is a schematic view illustrating the construction of two locking mechanisms respectively associated with a handle frame and a front leg frame of the infant stroller apparatus.

In conjunction with FIGS. 1 and 2, FIGS. 4-9 are various schematic views illustrating further construction details of the joint structure J, which can include two locking mechanisms respectively associated with the handle frame 10 and the front leg frame 20. Referring to FIGS. 1, 2 and 4, according to an example of construction, the joint structure J can include three coupling parts 11, 21 and 31 that are respectively affixed with the three side segments 10A, 20A and 30A and are pivotally connected with one another about two different pivot axes O1 and O2. As better shown in FIGS. 2 and 4, the coupling part 11 can be fixedly attached to a lower end of the side segment 10A of the handle frame 10, and can exemplary include a housing 114 and a reinforcing member 115 fixedly connected with each other. The coupling part 21 can be fixedly attached to an upper end of the side segment 20A of the front leg frame 20, and can exemplary include a housing 214 and a reinforcing member 215 fixedly connected with each other. The coupling part 31 can be fixedly attached to an upper end of the side segment 30A of the rear leg frame 30, and can exemplary include a housing 314 and a reinforcing member 315 fixedly connected with each other. The housings 114, 214 and 314 can exemplary be made of plastic materials, and the reinforcing members 115, 215 and 315 may exemplary be metallic plates respectively disposed inside the housings 114, 214 and 314.

The coupling part 31 fixedly connected with the side segment 30A of the rear leg frame 30 can have an elongate shape including a first or upper portion 312 projecting upward, and a second or lower portion 313 projecting downward. The coupling part 11 affixed to the side segment 10A of the handle frame 10 can be pivotally connected with the upper portion 312 of the coupling part 31 about the pivot axis O1, and the coupling part 21 affixed to the side segment 20A of the front leg frame 20 can be pivotally connected with the lower portion 313 of the coupling part 31 about the pivot axis O2. These pivot connections can include, e.g., pins or rivets assembled through corresponding holes provided in the coupling parts 11, 21 and 31. Accordingly, the handle frame 10 and the front leg frame 20 are respectively connected pivotally with the rear leg frame 30 about two different pivot axes O1 and O2. When the infant stroller apparatus 1 is in the unfolded state (as shown in FIGS. 1 and 2), the coupling part 31 can extend generally vertically, and the pivot axis O1 is located above the pivot axis O2.

Referring to FIG. 4, the coupling part 31 of the rear leg frame 30 may further include an arcuate guide slot 491 having two opposite ends 491A and 491B (e.g., the guide slot 491 may be formed in the reinforcing member 315), and the coupling part 11 of the handle frame 10 may be attached with a pin 492 guided for sliding movement along the guide slot 491. The guide slot 491 is centered on the pivot axis O1 of the pivot connection between the coupling parts 11 and 31. During rotation of the handle frame 10, the pin 492 can slide along the guide slot 491 between its ends 491A and 491B, which can delimit a range of rotational displacement of the handle frame 10 relative to the rear leg frame 30.

Figure 5:
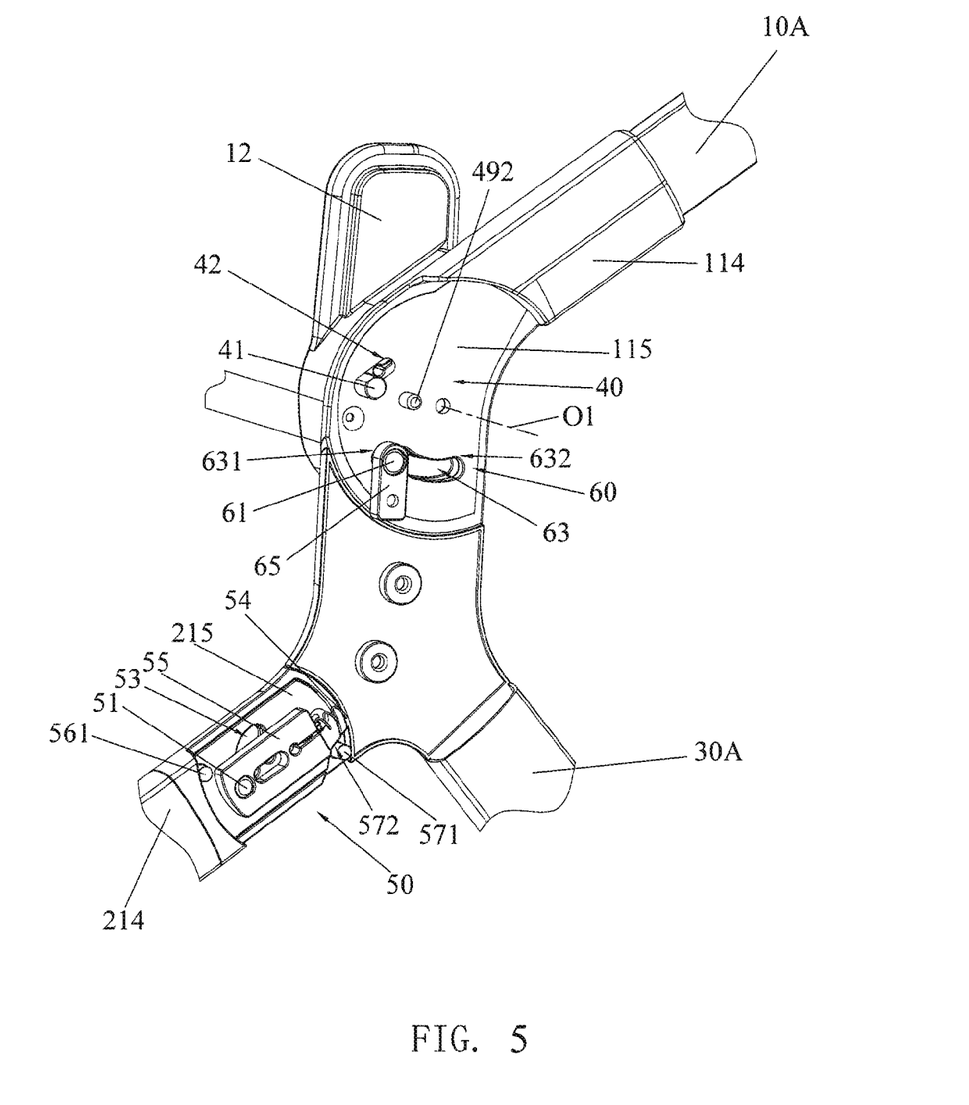
FIG. 5 is a schematic view illustrating the assembly of the two locking mechanisms with respect to two coupling parts respectively attached to the handle frame and the front leg frame of the infant stroller apparatus.

Referring to FIGS. 4 and 5, the coupling part 21 of the front leg frame 20 may be attached with a stop pin 561, and the coupling part 31 of the rear leg frame 30 may have a recess 562, both the stop pin 561 and the recess 562 being disposed eccentric from the pivot axis O2. The stop pin 561 can abut against the recess 562 when the infant stroller apparatus 1 reaches the unfolded state, which can thereby limit the rotation of the front leg frame 20 relative to the rear leg 30 in the unfolding direction. Further limiting structures may be added for assisting the front leg frame 20 to stop in the unfolded state. For example, the lower portion 313 of the coupling part 31 can also be attached with a stop pin 571, and the coupling part 21 can have a recess 572 disposed eccentric from the pivot axis O2 at a rearward location relative to the recess 562. Likewise, the stop pin 571 can abut against the recess 572 when the infant stroller apparatus 1 reaches the unfolded state. Accordingly, the two stop pins 561 and 571 can respectively contact against the two recesses 562 and 572 for preventing excessive rotation of the front leg frame 20 in the unfolding direction.

Referring again to FIGS. 1 and 2, an inner side of each coupling part 11 can be respectively assembled with a seat connector 12, and an inner side of each side segment 30A of the rear leg frame 30 can be respectively assembled with another seat connector 33 positioned lower than the seat connector 12. The seat connectors 12 and 33 can receive the removable installation of an infant carrier (not shown), which may be a stroller seat, a bassinet, an infant car seat and the like. The seat connectors 12 and 33 can engage with a same type of infant carrier or two different infant carriers, e.g., the seat connector 12 can receive a bassinet, and the seat connector 33 can receive a bassinet or a stroller seat.

Referring to FIGS. 1-4, the infant stroller apparatus 1 can further include a first or upper locking mechanism 40, a second or lower locking mechanism 50 and a linkage assembly 60. The upper locking mechanism 40 can be disposed between the coupling part 11 and the upper portion 312 of the coupling part 31, and can rotationally lock the handle frame 10 in position with respect to the rear leg frame 30. The lower locking mechanism 50 can be disposed between the coupling part 21 and the lower portion 313 of the coupling part 31, and can rotationally lock the front leg frame 20 in position with respect to the rear leg frame 30. The upper and lower locking mechanisms 40 and 50 can operate to lock the infant stroller apparatus 1 in the unfolded state for use shown in FIG. 1. The linkage assembly 60 is respectively connected with the upper locking mechanism 40 and the lower locking mechanism 50, and can couple a folding movement of the handle frame 10 with an unlocking movement of the lower locking mechanism 50. In other words, once the upper locking mechanism 40 is in the unlocking state, a rotation of the handle frame 10 in a folding direction can urge the lower locking mechanism 50 to unlock via the coupling of the linkage assembly 60, thereby allowing folding rotation of the front leg frame 20. As shown in FIG. 3, the handle frame 10 and the front leg frame 20 can be folded adjacent to the rear leg 30 when the infant stroller apparatus 1 is in a collapsed state.

Referring to FIGS. 1 and 4-7, the upper locking mechanism 40 can include a latch 41, a guide slot 42 provided in the coupling part 11 (e.g., formed in the reinforcing member 115), and another guide slot 43 provided in the upper portion 312 of the coupling part 31 (e.g., formed in the reinforcing member 315). The guide slot 42 can have an elongate shape, and overlap at least partially with the guide slot 43. The guide slot 43 can include a straight portion 431, an arcuate portion 432 that is connected with the straight portion 431 and is centered on the pivot axis O1 of the pivot connection between the coupling parts 11 and 31, and a fold locking recess 44 connected with the arcuate portion 432 at an end thereof opposite to the straight portion 431. During rotation of the handle frame 10 relative to the rear leg frame 30, the guide slot 42 can be displaced along the arcuate portion 432 between the straight portion 431 and the fold locking recess 44.

The latch 41 can be disposed between the coupling parts 11 and 31. As better shown in FIG. 6, the latch 41 can include a pin portion protruding sideways from a base 46, the pin portion being fixedly connected with the base 46. According to an example of construction, the latch 41 including the pin portion and the base 46 may be formed integrally as a single body. The latch 41 can be slidably assembled with the coupling part 11 with its pin portion disposed through the two guide slots 42 and 43. With this assembly, the latch 41 can slide along the guide slot 43 away from or toward the straight portion 431, depending on whether the handle frame 10 rotates in a folding or unfolding direction relative to the rear leg frame 30.

Figure 6:
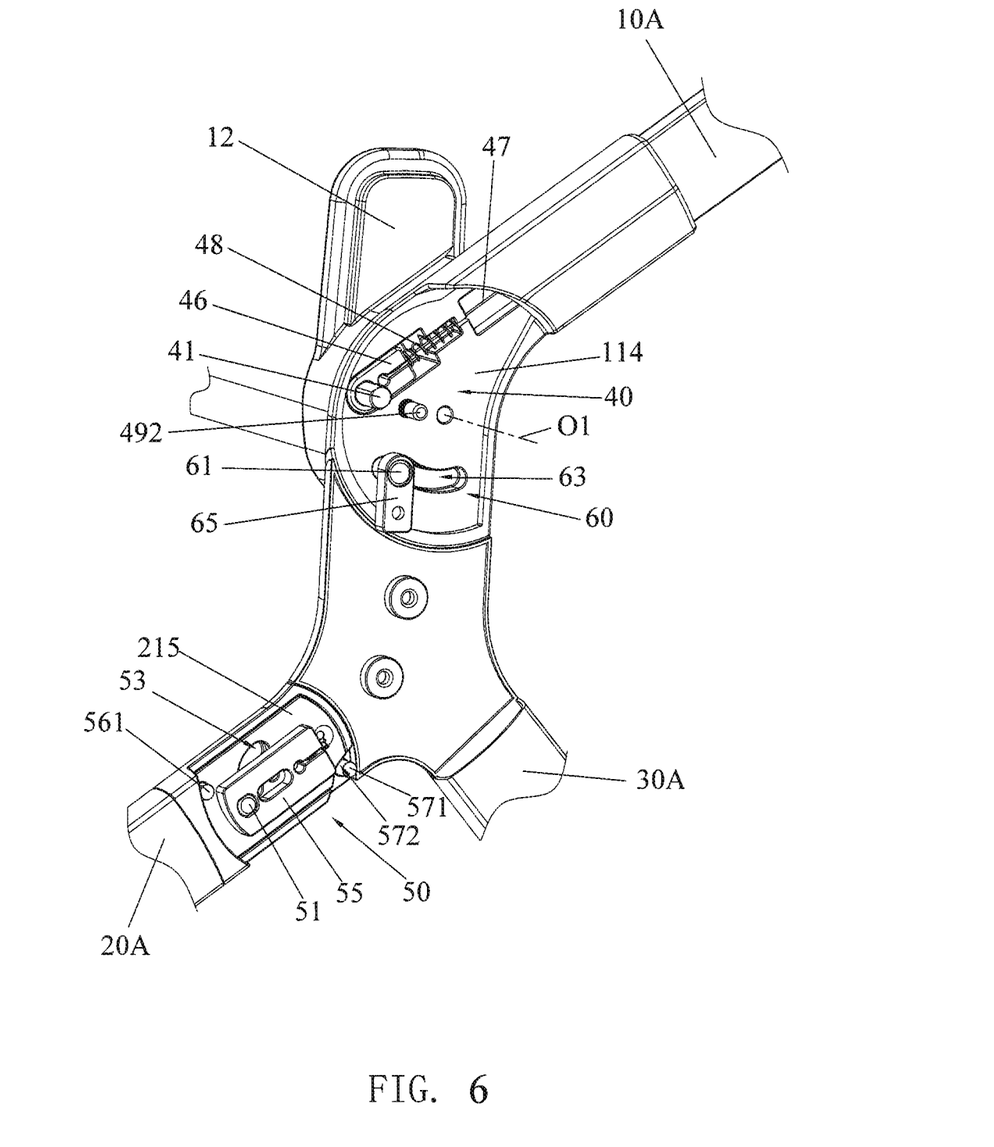
FIG. 6 is a schematic view illustrating further construction details of the coupling part attached to the handle frame of the infant stroller apparatus.
Figure 7:
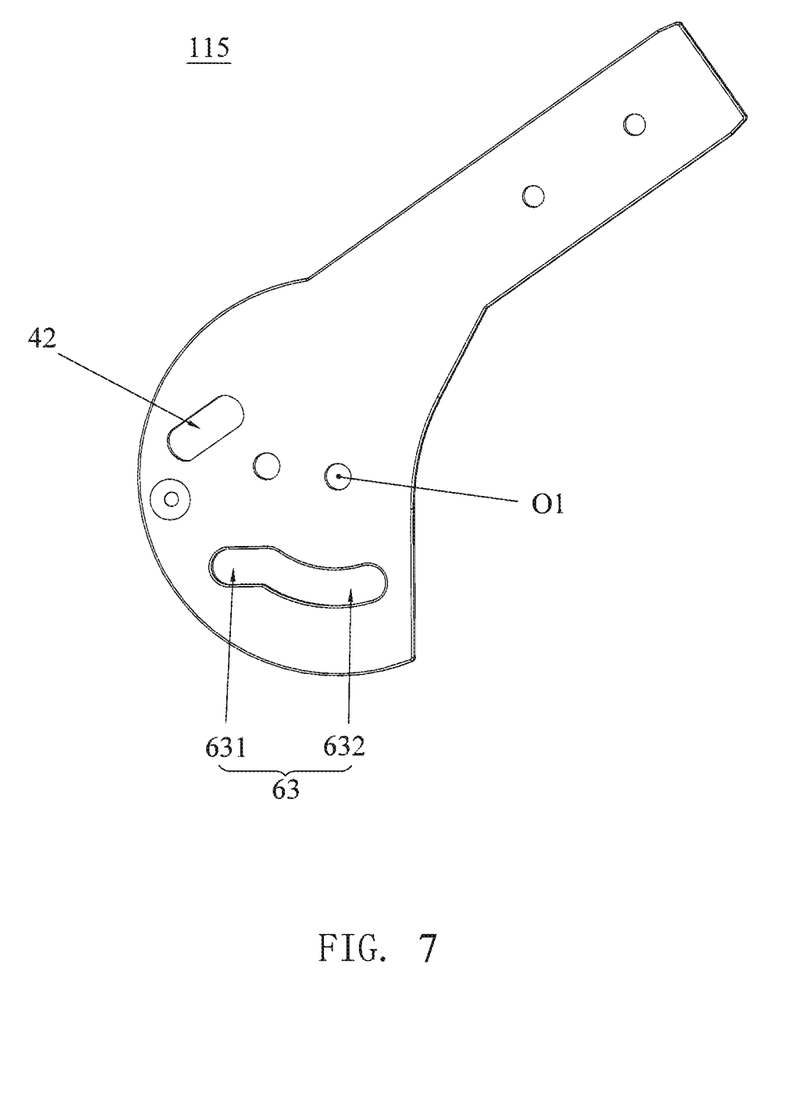
FIG. 7 is a schematic view illustrating the construction of a reinforcing member provided in the coupling part attached to the handle frame of the infant stroller apparatus.

Referring to FIGS. 1, 4 and 6, the upper locking mechanism 40 can further include a release actuator 45, a flexible drawing member 47 and a spring 48. The release actuator 45 can be slidably assembled on one side segment 10A of the handle frame 10, e.g., the release actuator 45 can include a sleeve through which the side segment 10A of the handle frame 10 is disposed.

The drawing member 47 can exemplary be a cable, a cord, a wire, a rope, a strip and the like. The drawing member 47 can have two opposite ends respectively attached to the release actuator 45 and the base 46 of the latch 41. The release actuator 45 is thereby operable to urge the latch 41 to move for unlocking the handle frame 10.

The spring 48 can have two ends respectively connected with the base 46 of the latch 41 and the housing 114 of the coupling part 11. The spring 48 can bias the latch 41 for engagement with the straight portion 431, thereby rotationally locking the handle frame 10 with the rear leg frame 30.

When the handle frame 10 is in an unfolded position corresponding to the unfolded state of the infant stroller apparatus 1 shown in FIGS. 1, 2 and 4, the straight portion 431 of the guide slot 43 can be generally parallel and adjacent to the guide slot 42 with the latch 41 engaging with the straight portion 431 under the biasing action of the spring 48. The engagement of the latch 41 with the straight portion 431 can prevent rotation of the handle frame 10 about the pivot axis O1 relative to the rear leg frame 30, and rotationally lock the handle frame 10 with respect to the rear leg frame 30 in the unfolded state of the infant stroller apparatus 1.

For folding the handle frame 10, a caregiver can slide the release actuator 45 upward along the side segment 10A of the handle frame 10, which can pull on the drawing member 47 and urge the latch 41 to slide along the guide slots 42 and 43 against the biasing action of the spring 48. As a result, the latch 41 can disengage from the straight portion 431 and enter the arcuate portion 432, which switches the upper locking mechanism 40 to an unlocking state. The handle frame 10 is thereby unlocked, and can rotate relative to the rear leg 30 to a collapse position adjacent to the rear leg 30. During rotation of the handle frame 10, the latch 41 can slide along the arcuate portion 432, and the sliding pin 492 can travel along the guide slot 491. Once the handle frame 10 reaches its collapse position corresponding to the collapsed state of the infant stroller apparatus 1 shown in FIG. 3, the pin 492 can abut against the end 491B of the guide slot 491, and the latch 41 can engage with the fold locking recess 44 to keep the handle frame 10 in position.

When the handle frame 10 is to be unfolded, the latch 41 is first disengaged from the fold locking recess 44 for unlocking the handle frame 10. In some example of implementation, the fold locking recess 44 may have a shallow depth, such that an unfolding rotation of the handle frame 10 away from its collapse position can force the latch 41 to disengage from the fold locking recess 44. After disengagement of the latch 41 from the fold locking recess 44, the handle frame 10 can rotate away from the rear leg frame 30 for unfolding the infant stroller apparatus 1. As a result, the latch 41 slides along the arcuate portion 432 toward the straight portion 431, and the pin 492 travels along the guide slot 491. Once the handle frame 10 reaches its unfolded position, the pin 492 can abut against an end 491A of the guide slot 491 opposite to its end 491B, and the latch 41 can be located at a position in the arcuate portion 432 that is adjacent to the straight portion 431. The spring 48 then can bias the latch pin 41 to engage with the straight portion 431 so that the upper locking mechanism 40 is switched to a locking state, thereby locking the handle frame 10 in its unfolded position.

Referring to FIGS. 4-9, the lower locking mechanism 50 can include a latch 51, a guide slot 52 provided in the lower portion 313 of the coupling part 31 (e.g., formed in the reinforcing member 315), another guide slot 53 provided in the coupling part 21 (e.g., formed in the reinforcing member 215), and a spring 54. The guide slot 52 can have an elongate shape, and overlap at least partially with the guide slot 53. The guide slot 53 can include a straight portion 531, and an arcuate portion 532 that is connected with the straight portion 531 and is centered on the pivot axis O2 of the pivot connection between the coupling parts 21 and 31. During rotation of the front leg frame 20 relative to the rear leg frame 30, the guide slot 52 can be displaced along the guide slot 53.

The latch 51 can be disposed between the coupling parts 21 and 31. The latch 51 can include a pin portion protruding sideways from a base 55, the pin portion being fixedly connected with the base 55. According to an example of construction, the latch 51 including the pin portion and the base 55 may be formed integrally as a single body. The latch 51 can be slidably assembled with the coupling part 31 with its pin portion disposed through the two guide slots 52 and 53. With this assembly, the latch 51 is movable relative to the coupling parts 21 and 31 independently from the latch 41 to effect locking and unlocking of the front leg frame 20 with respect to the rear leg frame 30. Once it unlocks the front leg frame 20, the latch 51 can slide along the guide slot 53 away from or toward the straight portion 531, depending on whether the front leg frame 20 rotates in a folding or unfolding direction relative to the rear leg frame 30.

The spring 54 can have two ends respectively connected with the base 55 of the latch 51 and a post (not shown) provided in the housing 214 of the coupling part 21. The spring 54 can bias the latch 51 for engagement with the straight portion 531 of the guide slot 53 provided in the coupling part 21, thereby rotationally locking the front leg frame 20 with the rear leg frame 30. According to an example of implementation, the spring 54 can be assembled around a portion of the drawing member 64.

Referring to FIGS. 4-8, the linkage assembly 60 can be respectively connected with the coupling part 11 of the handle frame 10 and the latch 51 such that a folding rotation of the handle frame 10 relative to the rear leg frame 30 can urge an unlocking displacement of the latch 51. According to an example of construction, the linkage assembly 60 can include a slider 61, a guide slot 62 provided in the coupling part 31 (e.g., formed in the reinforcing member 315 thereof), another guide slot 63 provided in the coupling part 11 (e.g., formed in the reinforcing member 115 thereof), and a flexible drawing member 64. The guide slot 62 has a straight shape, and overlap at least partially with the guide slot 63. The guide slot 63 can include a straight portion 631 tilted an angle relative to the guide slot 62, and an arcuate portion 632 that is connected with the straight portion 631 and is centered on the pivot axis O1 of the pivot connection between the coupling parts 11 and 31.

The slider 61 can be slidably assembled with the coupling part 31, and can be connected with the coupling part 11 so that a folding rotation of the handle frame 10 can urge the slider 61 to move relative to the coupling part 31. More specifically, the slider 61 can exemplary include a pin disposed through the two guide slots 62 and 63, and can be thereby guided for sliding movement along the guide slots 62 and 63.

The drawing member 64 can exemplary be a cable, a cord, a wire, a rope, a strip and the like. The drawing member 64 can have two opposite ends respectively attached to a base 65 of the slider 61 and the base 55 of the latch 51.

Figure 8:
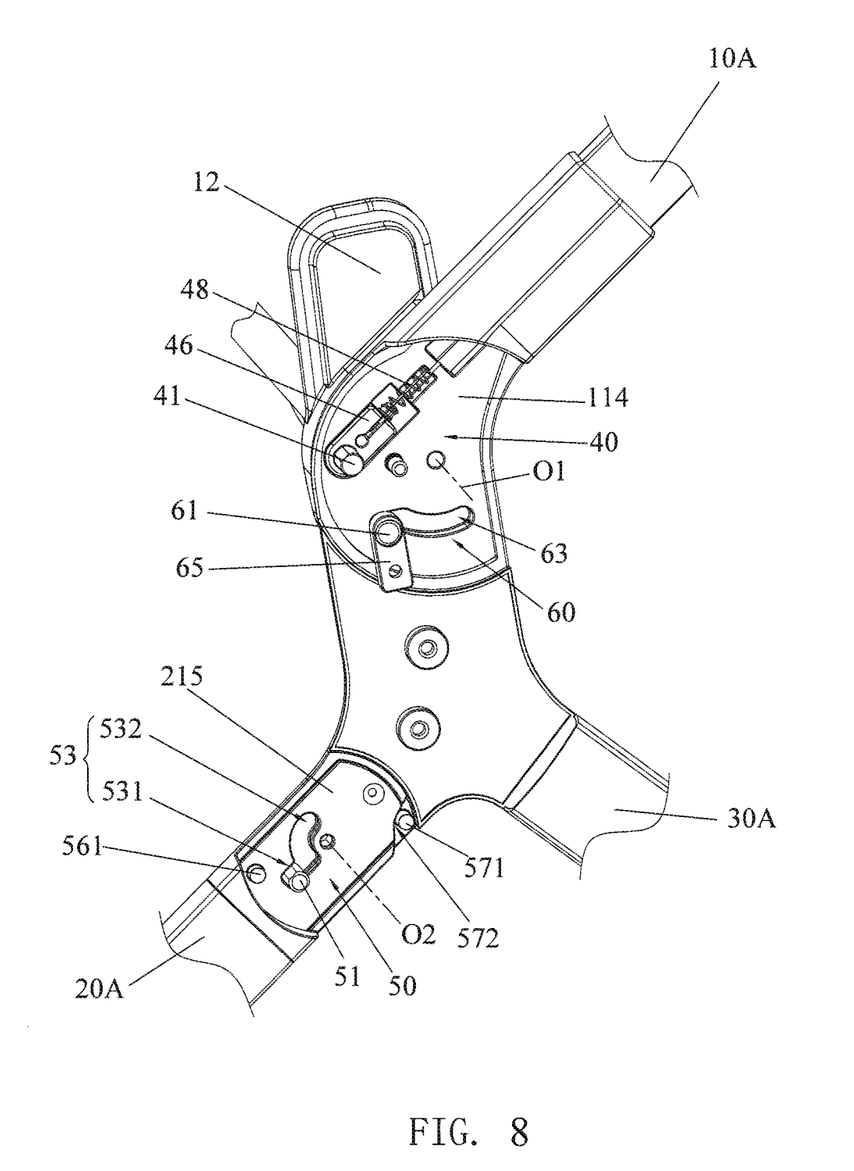
FIG. 8 is a schematic view illustrating further construction details of the coupling part attached to the front leg frame of the infant stroller apparatus.
Figure 9:
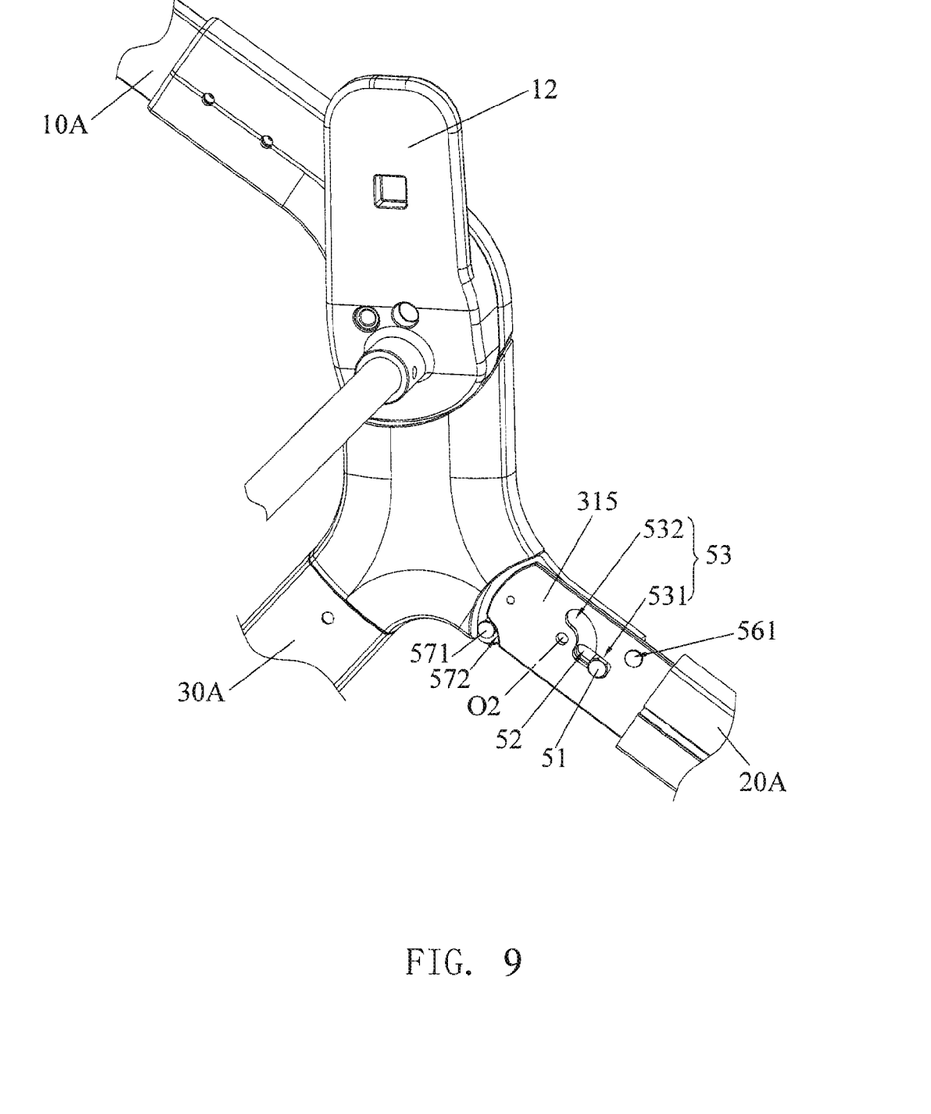
FIG. 9 is a schematic view illustrating further construction details of the locking mechanism associated with the front leg frame of the infant stroller apparatus.

When the front leg frame 20 is in its unfolded position corresponding to the unfolded state of the infant stroller apparatus 1 shown in FIGS. 1 and 8, the straight portion 531 of the guide slot 53 in the coupling part 21 can be generally parallel and adjacent to the guide slot 52 in the coupling part 31 with the latch 51 engaging with the straight portion 531 under the biasing action of the spring 54. The latch 51 can thereby rotationally lock the front leg frame 20 with respect to the rear leg frame 30 in the unfolded state of the infant stroller apparatus 1.

While the infant stroller apparatus 1 is in the unfolded state, the upper locking mechanism 40 can lock the handle frame 10 in its unfolded position with the slider 61 positioned adjacent to the straight portion 631 of the guide slot 63 and a lower end of the guide slot 62.

After the upper locking mechanism 40 is unlocked by operating the release actuator 45 as previously described, a rotation of the handle frame 10 relative to the rear leg frame 30 in the folding direction can urge the slider 61 to slide relative to the coupling part 31 from the lower end to the upper end of the guide slot 62 owing to the sliding contact between the slider 61 and the guide slot 63 (in particular the straight portion 631 thereof). The displacement of the slider 61 along the guide slot 62 from its lower end to its upper end can pull on and tension the drawing member 64, which in turn can urge the latch 51 to slide along the guide slots 52 and 53. As a result, the latch 51 can disengage from the straight portion 531 and enter the arcuate portion 532, which can switch the lower locking mechanism 50 to an unlocking state. The front leg frame 20 is thereby unlocked, and can rotate relative to the rear leg frame 30 to a position adjacent to the rear leg 30 for collapsing the infant stroller apparatus 1. During rotation of the front leg frame 20 relative to the rear leg frame 30, the latch 51 can slide along the arcuate portion 532 of the guide slot 53. The latch 51 can be positioned adjacent to an end of the arcuate portion 532 opposite to the straight portion 531 when the front leg frame 20 reaches the collapse position adjacent to the rear leg frame 30.

For unfolding the infant stroller apparatus 1, the handle frame 10 can be rotated upward away from the rear leg frame 30, which can cause the latch 41 to slide along the arcuate portion 432 toward the straight portion 431 of the guide slot 43, and the slider 61 to slide relative to the coupling part 31 from the upper end to the lower end of the guide slot 62 for loosening the drawing member 64. Once the handle frame 10 reaches its unfolded position, the spring 48 can bias the latch pin 41 to engage with the straight portion 431 so that the upper locking mechanism 40 is switched to the locking state for locking the handle frame 10 in its unfolded position. Then the front leg frame 20 can be rotated away from the rear leg frame 30, which can cause the latch 51 to slide along the arcuate portion 532 toward the straight portion 531 of the guide slot 53. When the front leg frame 20 reaches its unfolded position, the stop pins 561 and 571 can respectively abut against the recesses 562 and 572, and the latch 51 can be located at an end of the arcuate portion 532 adjacent to the straight portion 531. The biasing force applied by the spring 54 then can urge the latch 51 to slide from the arcuate portion 532 into the straight portion 531 of the guide slot 53. The lower locking mechanism 50 can thereby automatically switch to the locking state for rotationally locking the front leg frame 20 with the rear leg frame 30.

It will be appreciated that the infant stroller apparatus 1 may also be unfolded by first unfolding the front leg frame 20 relative to the rear leg frame 30, and then unfolding the handle frame 10 relative to the rear leg frame 30. When the front leg frame 20 is first unfolded while the handle frame 10 remains in its folded position, the slider 61 would still remain in a position (i.e., adjacent to the upper end of the guide slot 62) that prevents the locking engagement of the latch 51 with the straight portion 531 of the guide slot 53. The latch 51 will engage the straight portion 531 of the guide slot 53 to lock the front leg frame 20 in its unfolded position only once the handle frame 10 is unfolded.

Advantages of the structures described herein include the ability to provide two latches for respectively locking the handle frame and the front leg frame in the unfolded state of the infant stroller apparatus, and a linkage assembly for coupling a folding rotation of the handle frame with an unlocking movement of the latch associated with the front leg frame. As a result, the infant stroller apparatus can be locked in the unfolded state in a reliable manner, and only one release actuator is manually operated for unlocking the latch associated with the handle frame, the latch associated with the front leg frame unlocking automatically as the handle frame rotates in the folding direction. Accordingly, the infant stroller apparatus can be easily operated for folding and unfolding.

Realization of the infant stroller apparatus has been described in the context of particular embodiments. These embodiments are meant to be illustrative and not limiting. Many variations, modifications, additions, and improvements are possible. These and other variations, modifications, additions, and improvements may fall within the scope of the inventions as defined in the claims that follow.

What is claimed is:

1. An infant stroller apparatus comprising:
    a first leg frame having a first side segment fixedly connected with a first coupling part;
    a second leg frame having a second side segment fixedly connected with a second coupling part, the second coupling part being pivotally connected with the first coupling part;
    a handle frame having a third side segment fixedly connected with a third coupling part, the third coupling part being pivotally connected with the first coupling part;
    a first latch disposed between the first and third coupling parts, the first latch being operable to rotationally lock the handle frame with respect to the first leg frame in an unfolded state of the infant stroller apparatus;
    a second latch disposed between the first and second coupling parts, the second latch being operable to rotationally lock the second leg frame with respect to the first leg frame in the unfolded state of the infant stroller apparatus; and
    a linkage assembly respectively connected with the third coupling part and the second latch such that a folding rotation of the handle frame relative to the first leg frame urges an unlocking displacement of the second latch, wherein the linkage assembly includes a slider, a first guide slot provided in the first coupling part, a second guide slot provided in the third coupling part, and a flexible drawing member having two opposite ends respectively connected with the slider and the second latch, the first guide slot at least partially overlapping with the second guide slot, and the slider being guided for sliding displacement along the first and second guide slots, thereby a folding rotation of the handle frame urges the slider to move relative to the first coupling part for pulling on the drawing member.

2. The infant stroller apparatus according to claim 1, wherein the third coupling part is pivotally connected with the first coupling part about a first pivot axis, and the second coupling part is pivotally connected with the first coupling part about a second pivot axis.

3. The infant stroller apparatus according to claim 1, wherein the first latch is slidably assembled with the third coupling part, and the first coupling part further includes a third guide slot having a straight portion and an arcuate portion connected with each other, the first latch engaging with the straight portion to rotationally lock the handle frame with respect to the first leg frame in the unfolded state of the infant stroller apparatus, and the first latch being disengaged from the straight portion and sliding along the arcuate portion during a rotation of the handle frame relative to the first leg frame.

4. The infant stroller apparatus according to claim 3, wherein the arcuate portion is connected with a fold locking recess provided at an end of the arcuate portion opposite to the straight portion, and the first latch being engaged with the fold locking recess when the infant stroller apparatus is in a collapsed state.

5. The infant stroller apparatus according to claim 1, wherein the third side segment is assembled with a release actuator, and the first latch is connected with the release actuator via a flexible second drawing member, the release actuator being operable to urge the first latch to move for unlocking the handle frame.

6. The infant stroller apparatus according to claim 5, wherein the second drawing member includes a cable, a cord, a wire, a rope, or a strip.

7. The infant stroller apparatus according to claim 1, further including a first spring connected with the first latch, the first spring biasing the first latch to a locking state.

8. The infant stroller apparatus according to claim 1, wherein the second latch is slidably assembled with the first coupling part, and the second coupling part includes a fourth guide slot having a straight portion and an arcuate portion connected with each other, the second latch engaging with the straight portion of the fourth guide slot to rotationally lock the second leg frame with respect to the first leg frame in the unfolded state of the infant stroller apparatus, and the second latch being disengaged from the straight portion of the fourth guide slot and sliding along the arcuate portion of the fourth guide slot during a rotation of the second leg frame relative to the first leg frame.

9. The infant stroller apparatus according to claim 1, further including a second spring connected with the second latch, the second spring biasing the second latch to a locking state.

10. The infant stroller apparatus according to claim 1, wherein the drawing member connected with the slider includes a cable, a cord, a wire, a rope, or a strip.

11. The infant stroller apparatus according to claim 1, wherein the second guide slot of the third coupling part has a straight portion and an arcuate portion connected with each other.

12. The infant stroller apparatus according to claim 11, wherein the slider is located in a position adjacent to the straight portion of the second guide slot in the unfolded state of the infant stroller apparatus.

13. The infant stroller apparatus according to claim 1, wherein the first and second latches are respectively assembled slidably with the third and first coupling parts, the first coupling part further includes a third guide slot having a straight portion and an arcuate portion connected with each other, and the second coupling part includes a fourth guide slot having a straight portion and an arcuate portion connected with each other, the first latch sliding along the first arcuate portion of the third guide slot during a rotation of the handle frame relative to the first leg frame and engaging with the straight portion of the third guide slot to rotationally lock the handle frame with respect to the first leg frame in the unfolded state of the infant stroller apparatus, and the second latch sliding along the arcuate portion of the fourth guide slot during a rotation of the second leg frame relative to the first leg frame and engaging with the straight portion of the fourth guide slot to rotationally lock the second leg frame with respect to the first leg frame in the unfolded state of the infant stroller apparatus.

14. The infant stroller apparatus according to claim 13, wherein the third coupling part is pivotally connected with the first coupling part about a first pivot axis, and the second coupling part is pivotally connected with the first coupling part about a second pivot axis, the arcuate portion of the third guide slot being centered on the first pivot axis, and the arcuate portion of the fourth guide slot being centered on the second pivot axis.

15. The infant stroller apparatus according to claim 1, wherein the first leg frame is a rear leg frame, and the second leg frame is a front leg frame.

16. The infant stroller apparatus according to claim 1, wherein the first coupling part extends generally vertically when the infant stroller apparatus is in the unfolded state, the second coupling part being pivotally connected with a lower portion of the first coupling part, and the third coupling part being pivotally connected with an upper portion of the first coupling part.

17. The infant stroller apparatus according to claim 1, wherein the third coupling part is assembled with a first seat connector, and the first side segment is assembled with a second seat connector positioned lower than the first seat connector, each of the first and second seat connectors being adapted to receive the removable installation of an infant carrier.

* * * * *